United States Patent [19]

Haas

[11] Patent Number: 4,789,036
[45] Date of Patent: Dec. 6, 1988

[54] HYDRAULIC STEERING DEVICE

[75] Inventor: Karl H. Haas, Oberelchingen, Fed. Rep. of Germany

[73] Assignee: Karl Kassbohrer Fahrzeugwerke GmbH, Fed. Rep. of Germany

[21] Appl. No.: 940,588

[22] Filed: Dec. 11, 1986

[30] Foreign Application Priority Data

Dec. 12, 1985 [EP] European Pat. Off. ........... 85115821

[51] Int. Cl.$^4$ .............................................. B62D 11/18
[52] U.S. Cl. ..................................... 180/6.48; 60/444
[58] Field of Search ..................... 180/6.48, 6.3, 6.34, 180/6.7, 6.2; 60/487, 444

[56] References Cited

U.S. PATENT DOCUMENTS

| | | | |
|---|---|---|---|
| 3,807,174 | 4/1974 | Wagenseil et al. | 180/6.48 |
| 4,076,090 | 2/1978 | Krusche et al. | 180/6.48 |
| 4,376,371 | 3/1983 | Kojima et al. | 180/6.48 X |
| 4,395,878 | 8/1983 | Morita et al. | 180/6.48 X |
| 4,458,485 | 7/1984 | Seelmann | 60/444 X |

FOREIGN PATENT DOCUMENTS

| | | |
|---|---|---|
| 2152726 | 1/1973 | Fed. Rep. of Germany . |
| 2403123 | 7/1974 | Fed. Rep. of Germany . |
| 2434514 | 1/1976 | Fed. Rep. of Germany . |
| 3208261 | 9/1982 | Fed. Rep. of Germany . |
| 3213361 | 10/1983 | Fed. Rep. of Germany . |

Primary Examiner—David M. Mitchell
Assistant Examiner—Mitchell J. Hill
Attorney, Agent, or Firm—Samuels, Gauthier, Stevens & Kehoe

[57] ABSTRACT

The invention relates to a hydraulic control system for changing the speed and direction of a hydraulically operated tracked vehicle (1). The hydraulic control system is equipped with a feed pump (34) for the control fluid and with hydraulic undercarriage pumps (12) and (13). The undercarriage pumps (12) and (13) comprise regulating cylinders (18) and (19) subjected to the control fluid and intended for adjusting the pump pivoting angle. The regulating cylinders (18) and (19) are each equipped with two regulating-cylinder chambers (26, 28) and 25, 27) separated from one another by a regulating piston (22) and (23). To improve the steering behavior of hydraulically controlled and driven tracked vehicles, according to the invention the regulating-cylinder chambers (25 to 28) are fluidically connected independently, via change-over valves (55 to 58), on the one hand to a first proportional valve (48) for changing the speed of the vehicle and on the other hand to at least one second proportional valve (44, 45) for changing the direction of the vehicle. The connection will be such that the first proportional valve (48) is connected respectively to co-acting regulating-cylinder chambers (26, 25) or (28, 27) and the second proportional valve (44, 45) is connected respectively to oppositely acting regulating-cylinder chambers (26, 27) or (28, 25).

9 Claims, 5 Drawing Sheets

HYDRAULIC STEERING DEVICE

DESCRIPTION

The present invention relates to a hydraulic control system for changing the speed and direction of a hydraulically operated tracked vehicle, with a feed pump for the control fluid and with hydraulic undercarriage pumps having regulating cylinders subjected to the control fluid and intended for adjusting the pump pivoting angle, the regulating cylinders each being equipped with two regulating-cylinder chambers separated from one another by a regulating piston.

Control systems of this type are known, for example, from military tracked vehicles or tracked vehicles for runway maintenance. In these systems, each of the driven chains has an undercarriage pump with a regulating cylinder for adjusting the pump pivoting angle. Each of these regulating cylinders is connected hydraulically to a regulating device to be actuated by hand. The hydraulic control circuit comprising the regulating cylinders and the actuating elements is supplied with the control fluid by means of a feed pump. By means of the known control system, each chain can be controlled independently of the other. The driver who has two actuating elements at his disposal uses these both to change the vehicle speed and to steer the vehicle. To change the speed, he varies the position of the actuating elements in the same direction, whereas for steering he deflects them to differing degrees, in order thereby to drive one chain of the vehicle more quickly or more slowly than the other. Although this control system is only slightly susceptible to faults in terms of its construction, under practical driving conditions it presents serious problems, since it is left to the driver to adjust the two actuating elements even for cornering. This results in a very jerky driving behavior of the tracked vehicle, and hitherto this has made it unsuitable for use on roads.

In contrast to this, the object on which the invention is based is to improve a control system of the type mentioned in the introduction in a simple way in terms of construction, so that the steering movement and the speed change of the tracked vehicle take place independently of one another.

This object is achieved because the regulating-cylinder chambers are fluidically connected independently, via change-over valves, on the one hand to a first proportional valve for changing the speed of the vehicle and on the other hand to at least one second proportional valve for changing the direction of the vehicle, in such a way that the first proportional valve is connected respectively to co-acting regulating-cylinder chambers and the second proportional valve is connected respectively to oppositely acting regulating-cylinder chambers.

This produces a hydraulic control system which is simple in terms of construction and which makes it possible to execute steering movements of the tracked vehicle independently of a change in the vehicle speed. The first proportional valve for the speed change is now activated completely independently of the second proportional valve for the change in speed of the vehicle. It is now no longer left to the driver to discover the ideal line for cornering by adjusting two actuating elements relative to one another. Since the second proportional valve is connected to the oppositely acting regulating-cylinder chambers of the two regulating cylinders, this ensures during cornering that one chain moves more quickly and the other chain more slowly than when the vehicle travels in a straight line. This ensures that the center of the vehicle maintains the same speed during cornering as when it travels in a straight line. A cornering behavior corresponding to that of wheeled vehicles is obtained for the tracked vehicle.

There are already combined hydraulic and electric control systems, in which, in practice, the actuating elements of the above-mentioned known hydraulic control system are moved by means of electric proportional controllers. The adjustment of the undercarriage pumps is coordinated with the steering of the vehicle via an electric circuit. A disadvantage of this control system is that, in addition to the hydraulic system already present in any case, there has to be a second complicated electric system which, apart from the high outlay in terms of construction, also increases the likelihood of failure of the control system. Even a voltage drop in the on-board power supply would lead to the failure of the control system. Under these circumstances, such a control system is at most possible for the cross-country use of tracked vehicles.

According to a development of the invention, there are two second proportional valves, of which one is intended for changing the direction to the right and the other for changing the direction to the left. Although there are two proportional valves, in comparison with the known hydraulic control system it is only necessary to actuate one proportional valve for cornering, in order to obtain an ideal coordination of the chain speeds for cornering.

It is especially favorable if the two second proportional valves are actuable by means of at least one cam disc attached to the control column of a steering wheel. Thus, for example when the steering wheel is actuated to the right, the proportional valve for changing the direction to the right can be actuated as a function of the angle of lock of the steering wheel, whilst in a steering lock to the left the proportional valve for changing the direction to the left can be actuated via the cam disc.

For actuating the first proportional valve which, in contrast to the known control system, can no longer be actuated via the actuating elements for changing the direction, it is beneficial if the first proportional valve is controllable by means of an electric proportional controller actuable by an accelerator pedal incorporating a potentiometer. In this way, as on a conventional wheeled vehicle, the speed of the tracked vehicle can be regulated by means of the accelerator pedal. At the same time, the accelerator pedal causes on the one hand the increase in speed of the engine driving the undercarriage pumps and on the other hand an adjustment of the pump pivoting angle of the undercarriage pumps.

Especially for negotiating steep slopes, it is advantageous that an actuable maximum-voltage limiter for limiting the greatest possible deflection of the proportional valve is arranged in series with the potentiometer. Thus, the maximum adjustment of the pump pivoting angle can be fixed, and in practice this corresponds to the fixing of a maximum transmission ratio. However, the speed of the driving engine can continue to be varied by means of the accelerator pedal, so that the vehicle can always be driven in the most favorable torque range. In this way it is also possible, on slopes becoming increasingly steep, with the accelerator pedal pressed down, to reduce the pump pivoting angle of the undercarriage pumps by means of the actuable maximum-voltage limiter, in order thereby to obtain a more favorable transmission ratio. It is favorable, particularly in this respect, if the maximum-voltage limiter is attached to the steering column so as to be actuable by hand.

Reversal of the direction of the tracked vehicle can be made possible in a simple way by arranging a 4/2-way valve between the first proportional valve and the changeover valves, in such a way that, to reverse the direction of the vehicle, in a second switch position the respective other co-acting regulating-cylinder chambers of the regulating cylinders are connected to the proportional valve.

It is especially favorable, at the same time, that the 4/2-way valve is coupled to a further 4/2-way valve arranged between the second proportional valves and the change-over valves, in such a way that, when the direction of the vehicle is reversed, the respective other oppositely acting regulating-cylinder chambers of the regulating cylinders are connected to the second proportional valves. This ensures that, even when the tracked vehicle is in reverse, a steering-wheel lock to the right also causes the vehicle to turn to the right.

According to a preferred embodiment, in the hydraulic control system there are two undercarriage pumps with two regulating cylinders, of which the regulating-cylinder chambers are connected, via four change-over valves, on the one hand via the first 4/2-way valve to the first proportional valve for changing the speed and on the other hand via the second 4/2-way valve to the second proportional valves for changing the direction.

It is advantageous if the 4/2-way valves coupled to one another are actuable electrically via a direction switch.

An exemplary embodiment of the invention is explained in more detail below with reference to a drawing.

Figure 1:
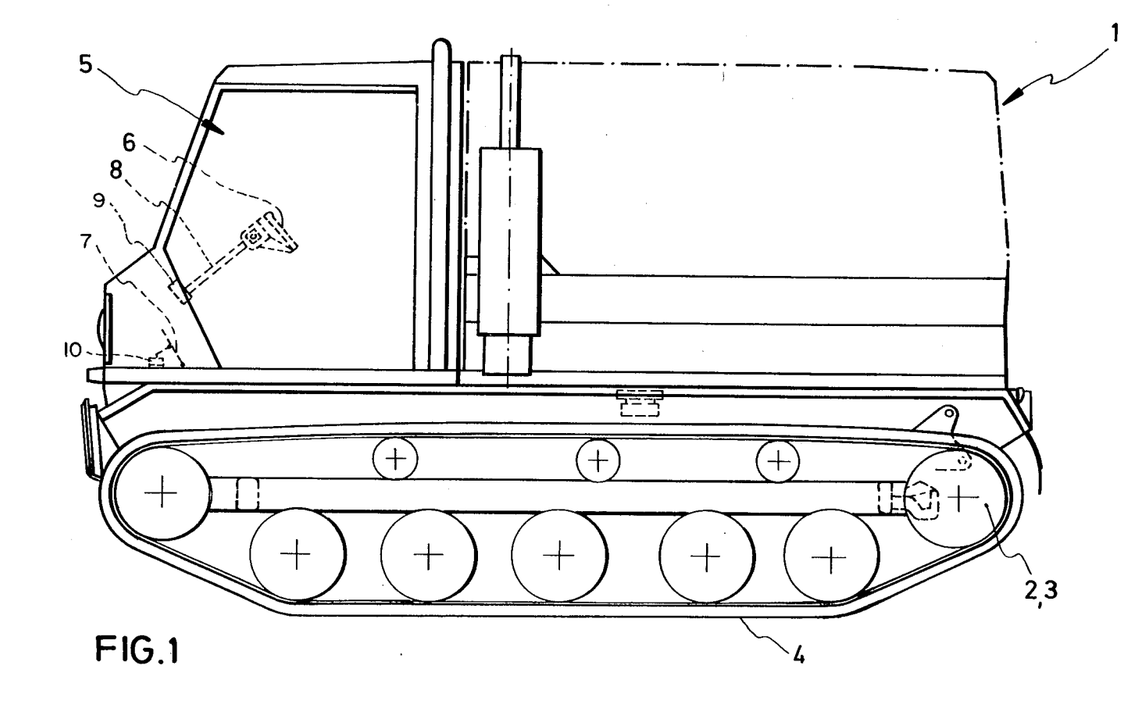
FIG. 1 shows a side view of a hydraulically driven tracked vehicle.

FIG. 1 shows a side view of a hydraulic tracked vehicle 1 with chains 4 driven via drive wheels 2 and 3. The tracked vehicle 1 also has a driver's cab 5, in which a steering wheel 6 and an accelerator pedal 7 are arranged in the usual way. The steering wheel 6 is connected operatively to a hydraulic control block 9 via a control column 8. The accelerator pedal 7 is coupled not only to the conventional actuating linkage for the internal combustion engine not shown in FIG. 1, but also to a potentiometer 10.

Figure 2:
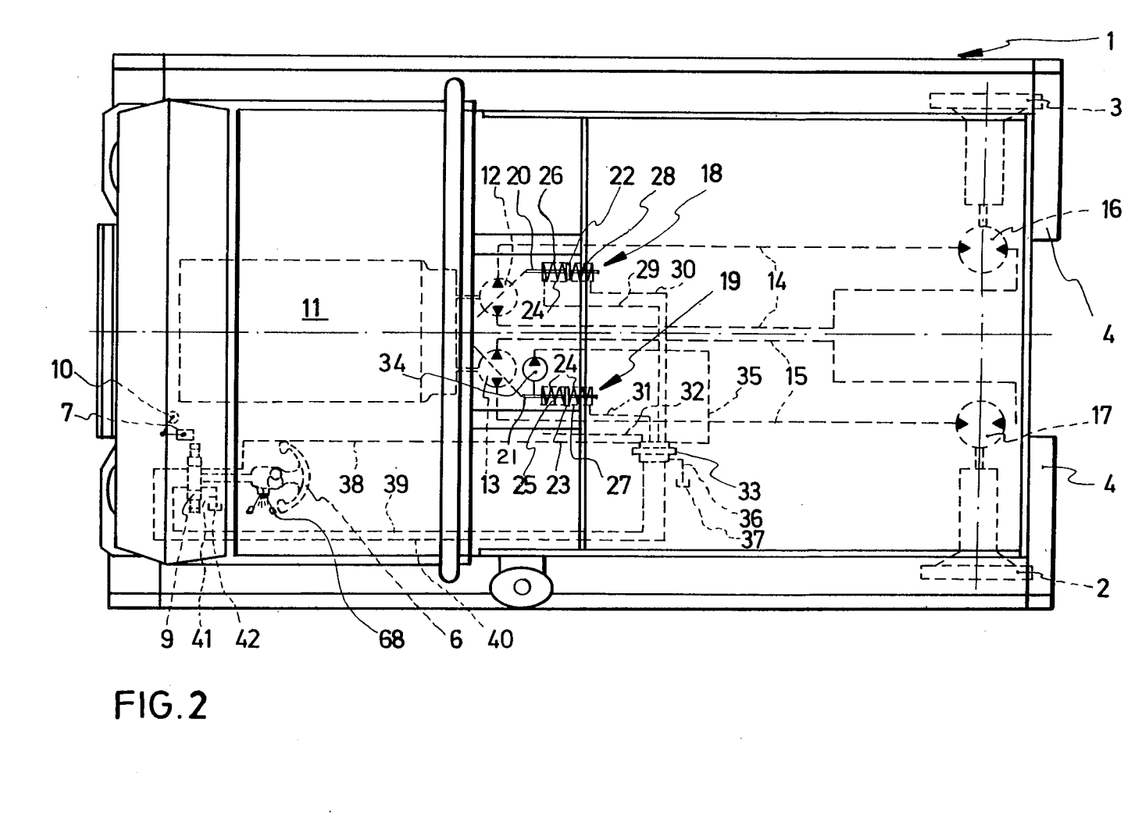
FIG. 2 shows a plan view of the tracked vehicle with a survey of the positions of the most important drive and control elements.

Referring now to FIG. 2, the essential subassemblies of the control system can be seen in a general view. The internal combustion engine is designated by reference symbol 11. The internal combustion engine 11 drives two hydraulic undercarriage pumps 12 and 13 which are located behind it and which are connected, via hydraulic pressure lines 14 and 15, to hydraulic motors 16 and 17 arranged in the rear of the tracked vehicle 1. The hydraulic motors 16 and 17 are connected mechanically to the drive wheels 2 and 3, so that the torque of the internal combustion engine 11 is transmitted to the chains 4 via the hydraulic undercarriage pumps 12 and 13, the hydraulic pressure lines 14 and 15, the hydraulic motors 16 and 17 and the drive wheels 2 and 3.

The pump pivoting angle o the hydraulic undercarriage pumps 12 and 13 can be adjusted, so that a torque conversion can thereby be carried out.

To adjust the pump pivoting angle of the hydraulic undercarriage pumps 12 and 13, a hydraulically actuable regulating cylinder 18 or 19 is provided for each of the hydraulic undercarriage pumps 12 or 13. Located in each regulating cylinder is an axially displaceable piston rod 20 or 21 with a regulating piston 22 or 23. The regulating pistons 22 and 23 are held in a center position by restoring springs 24 designed as compression springs. By means of the regulating pistons 22 and 23, the regulating cylinders 18 and 19 are subdivided into regulating-cylinder chambers 26, 28 and 25, 27. Each of the regulating-cylinder chambers 25 to 28 is connected to a second hydraulic control block 33 via a hydraulic control line 29, 30, 31 and 32. The second hydraulic control block 33 is supplied with control fluid by means of a feed pump 34 via a hydraulic supply line 35. Excess control fluid returns to a supply tank 37 via a hydraulic discharge line 36.

A hydraulic supply line 38 leads on the one hand from the second hydraulic control block 33 to the first hydraulic control block 9. From this, two hydraulic control lines 39 and 40 then lead back in turn to the second control block 33. Excess control fluid from the first control block 9 is delivered, via a discharge line 41, to a supply tank 42 which can be identical to the supply tank 37.

Figure 3:
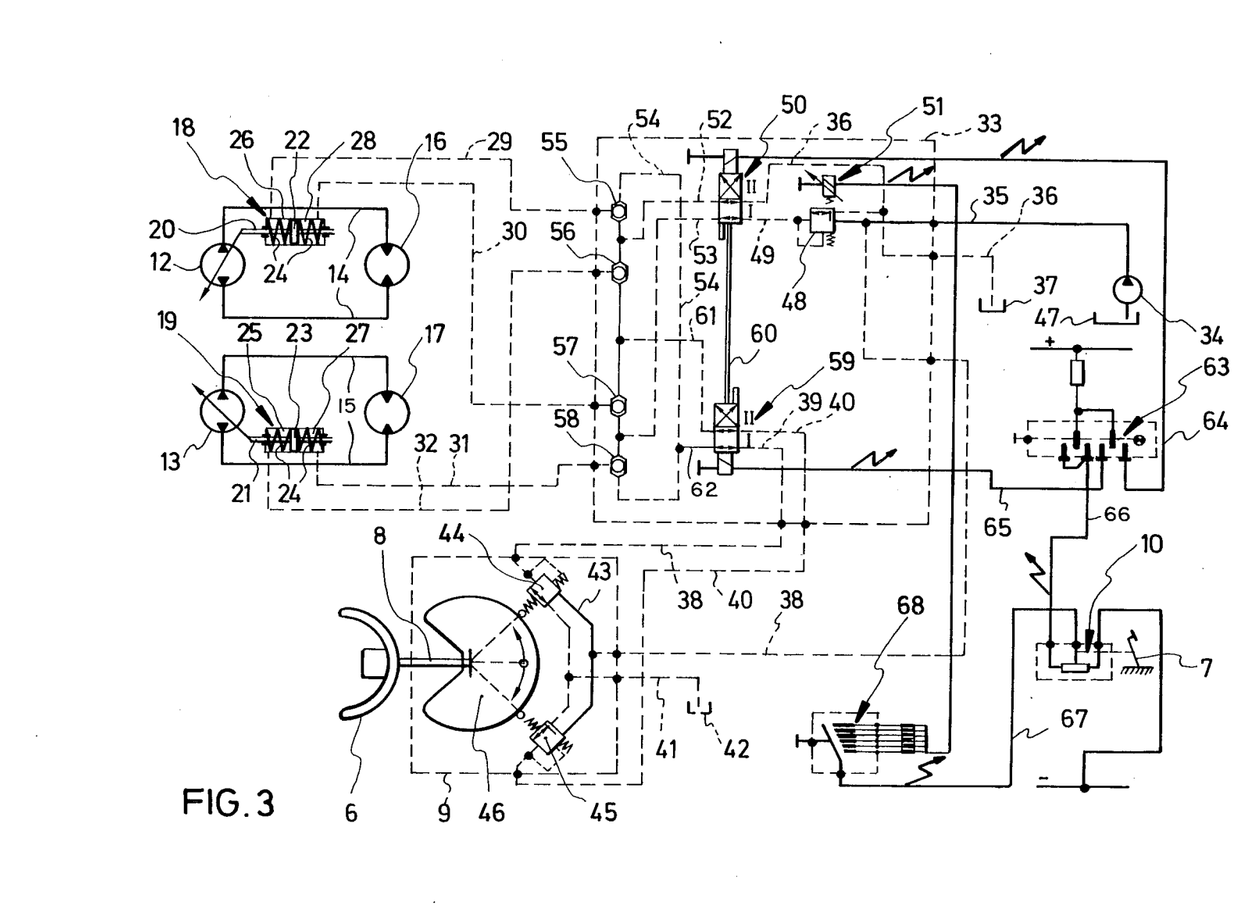
FIG. 3 shows a circuit diagram of the hydraulic control system according to the invention.

FIG. 3 shows the entire hydraulic control system of the tracked vehicle 1, the hydraulic control blocks 9 and 33 in particular also being shown in detail.

The hydraulic control block 9 intended for converting the mechanical steering movement is explained in more detail first. The supply line 38 leading to the hydraulic control block 9 leads to a ring conduit 43. There are two proportional valves 44 and 45 in the ring conduit 43. One outlet and the inlet of the proportional valves are coupled to the ring conduit 43, whilst a second outlet is connected to the hydraulic control lines 39 and 40. The proportional valves 44 and 45 are prestressed valves which operate only at a specific system pressure in the control system.

The proportional valves 44 and 45 are actuable mechanically via a cam disc 46 fastened to the control column 8 of the steering wheel 6. The cam disc 46 is designed so that the pressure of the control fluid behind the proportional valves 44 and 45 increases in proportion to the angle of lock of the steering wheel 6. The part of the ring conduit 43 connected to the first outlets of the proportional valves 44 and 45 is connected to the discharge line 41.

The second hydraulic control block 33 will now be described. The hydraulic supply line 35 leads from the feed pump 34, which sucks up fluid from a supply tank 47, into the control block 33 to a first proportional valve 48. This proportional valve has two outlets, of which one is connected to the discharge line 38, whilst the other leads via a control line 49 to a 4/2-way valve 50.

The proportional valve 48 is also a prestressed valve, like the proportional valves 44 and 45 already described. The proportional valve 48 is actuated via an electrically operated proportional controller 51. The 4/2-way valve 50 is likewise actuated electrically, as explained later. The second connection of the 4/2-way valve 50 leads back to the supply tank 37 via the discharge line 36. Two hydraulic control lines 52 and 53 are connected on the other side of the 4/2-way valve 50. The two control lines 52 and 53 lead to a ring conduit 54, in which change-over valves 55 to 58 are arranged. The arrangement of the change-over valves 55 to 58 is such that the two change-over valves 55 and 56 are arranged in the ring conduit 54 on both sides of the mouth of the control line 52, whilst the change-over valves 57 and 58 are arranged in the ring conduit 54 on both sides of the mouth of the control line 53. The change-over valves 55 to 58 are designed in such a way that the connections located in the ring conduit 54 are closed or open, depending on the pressure conditions in the ring conduit. Furthermore, each change-over valve 55 to 58 has a further outlet which is always open and which is connected respectively to the hydraulic control lines 29 to 32 leading to the regulating cylinders 18 and 19.

The two control lines 39 and 40 leading out of the hydraulic control block 9 open into the control block 33 and likewise open into a 4/2-way valve 59. This valve which is also electrically actuable is coupled mechanically to the 4/2-way valve 50 via a linkage 60, so that the two 4/2-way valves 50 and 59 are always actuated simultaneously. The connections located on the other side of the 4/2-way valve 59 are connected to the ring conduit 54 via hydraulic control lines 61 and 62. The control line 61 here opens into the ring conduit 54 between the two change-over valves 56 and 57. On the other hand, the control line 62 opens into the ring conduit 54 between the change-over valves 55 and 58.

The electric circuit for actuating the two 4/2-way valves 50 and 59 on the one hand and the first proportional valve 48 on the other hand is described in more detail next. The electric circuit comprises a direction-reversing switch 63 which on the one hand is connected to the 4/2-way valve 50 or 59 via respective electrical lines 64 and 65. The direction-reversing switch 63 can be switched to three settings. In the neutral position shown in FIG. 3, the 4/2-way valves 50 and 59 remain in their previous position. When the contact of the direction-reversing switch 63 to the electrical line 64 is closed, the two 4/2-way valves 50 and 59 move into the position I shown in FIG. 3 or remain in this. When the contact of the direction-reversing switch 63 to the electrical line 65 is closed, the 4/2-way valves 50 and 59 move into the position II, in which the outlets of the 4/2-way valves 50 and 59 assigned to the inlets are interchanged.

The direction-reversing switch also has a third outlet which is connected via an electrical line 66 to the potentiometer 10 actuable via the accelerator pedal 7. One outlet of the potentiometer 10 is grounded, whilst the other is connected to the proportional controller 51 via a further electrical line 67. In the electrical line 67, a maximum-voltage limiter 68 is connected in series to the proportional controller 51.

As shown in FIG. 3, the direction-reversing switch 63 is in its neutral position. In this position, neither the potentiometer 10 is supplied with current, nor are the two interconnected and electrically actuable 4/2-way valves 50 and 59 in a specific switching position. As soon as one of the two driving positions, namely "forwards" or "reverse", is selected by means of the direction-reversing switch 63, current is applied to the potentiometer 10 actuable by the accelerator pedal 7. When the accelerator pedal 7 is adjusted, the first proportional valve 48 is consequently controlled in proportion by means of the proportional controller 51. The maximum deflection of the first proportional valve 48 depends here on the preselected position or voltage of the maximum-voltage limiter 68. Therefore, the maximum obtainable pump pivoting angle is also dependent on the position of the maximum-voltage limiter 68.

In a known way, the accelerator pedal 7 ensures not only that the potentiometer 10 is actuated, but also that the speed of the internal combustion engine 11 is changed via an actuating element.

Figure 4:
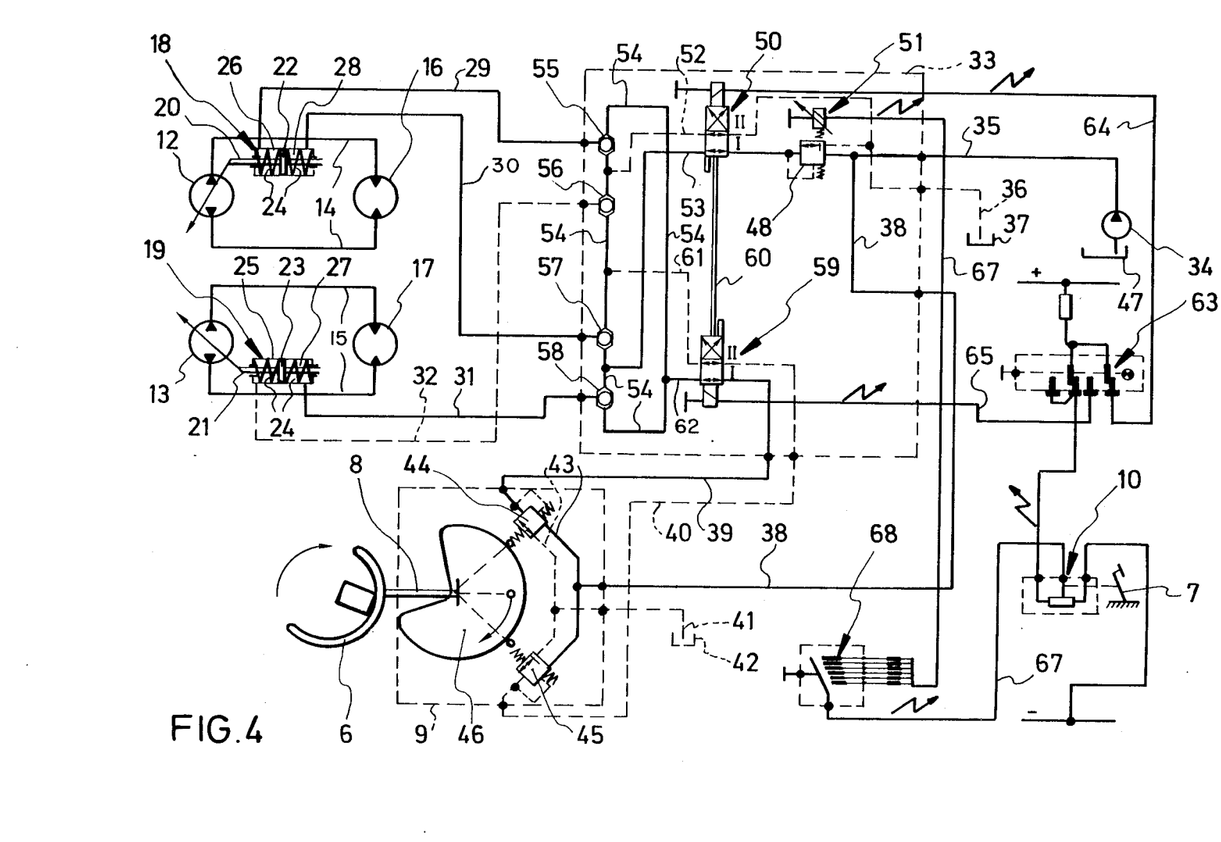
FIG. 4 shows a circuit diagram of FIG. 3 when the tracked vehicle turns to the right in the forward driving direction.

The functioning of the invention during operation is explained in more detail below. With reference to FIG. 4, the function of the hydraulic control system is described by the example of a vehicle driving forwards and at the same time turning right.

The internal combustion engine 11 is first started, thereby activating the undercarriage pumps 12 and 13. However, it is still not possible for the vehicle to move, since the pump pivoting angle of the hydraulic undercarriage pumps 12 and 13 is still zero. Next, the direction-reversing switch 63 is moved to the right, as shown in FIG. 4. The current flowing via the electrical line 64 causes the two 4/2-way valves 50 and 59 to be moved into the switching position I or to remain in this position. This is the position for forward driving. The 4/2-way valves 50 and 59 can be held in this position by locking.

When the direction-reversing switch 63 is actuated, current is consequently applied to the potentiometer 10 at the same time. Depending on the terrain, the maximum-voltage limiter 68 attached to the steering column and actuable by hand is brought into the desired driving position. When the accelerator pedal 7 is actuated, a voltage is applied to the proportional valve 51 and changes in proportion to the position of the accelerator pedal, thus ensuring a proportional adjustment of the first proportional valve 48. At the same time, a pressure builds up in the hydraulic control system by means of the feed pump 34. Only when this pressure has reached 8 bars can the prestress of the proportional valves 44, 45 and 48 be overcome. When the accelerator pedal 7 is pressed down further, control fluid thus flows through the first proportional valve 48 and through the 4/2-way valve 50 and the control line 53 to the two change-over valves 57 and 58. As a result of the higher pressure, these two change-over valves 57 and 58 free the inlet, so that the control fluid passes via the control lines 30 and 31 to the front regulating-cylinder chambers 28 and 27 of the regulating cylinders 18 and 19. The regulating pistons 22 and 23 and the piston rods 20 and 21 connected to them are thereby shifted, so that the pump pivoting angle of the hydraulic undercarriage pumps 12 and 13 increases. Via the pressure lines 14 and 15, hydraulic fluid is now pumped to the hydraulic motors 16 and 17 which set the chains 4 of the vehicle in motion via the drive wheels 2 and 3. When the accelerator pedal 7 is pressed down further, the pump pivoting angle is consequently further increased, with the result that the driving speed of the tracked vehicle 1 increases. However, an adjustment of the pump pivoting angle by means of the accelerator pedal 7 can only be obtained as long as the maximum voltage preselected by means of the maximum-voltage limiter 68 is not exceeded. When this voltage value is reached, the pump pivoting angle no longer increases. On the other hand, it is also possible, in steeply rising terrain and with the accelerator pedal 7 pressed down, to reduce the voltage by means of the maximum-voltage limiter 68 and thus decrease the pump pivoting angle, in order thereby to select a lower transmission ratio.

When the steering wheel 6 is swung to the right, as shown in FIG. 4, the cam disc 46 likewise rotates to the right and actuates the right-hand proportional valve 44. This proportional valve, which is likewise subjected to pressure by the feed pump 34 via the supply line 38 branching off from the supply line 35 in front of the proportional valve 48, now allows control fluid to pass via the control line 39 through the 4/2-way valve 59 and the control line 62 into the ring conduit 54. A pressure thus builds up between the change-over valves 55 and 58. When the pressure applied to the change-over valves 55 and 58 exceeds the system pressure prevailing behind the first proportional valve 48, the change-over valves 55 and 58 allow the control fluid to enter the control lines 29 and 31. From there, the control fluid passes into the rear regulating-cylinder chamber 26 of the regulating cylinder 18 or into the front regulating-cylinder chamber 27 of the regulating cylinder 9. The control fluid produced as a result of the steering action has a higher pressure than that conveyed through the first proportional valve 48. This means that the pressure in the front regulating-cylinder chamber 27 of the regulating cylinder 19 increases, whilst in the other regulating cylinder 18 a pressure is built up in the rear regulating-cylinder chamber 26 and counteracts the drive pressure in the front regulating-cylinder chamber 28. The superimposition of the drive pressure on the pressure of the control fluid produced as a result of the steering action ensures that the control piston 22 of the regulating cylinder 18 moves back, whilst the control piston 23 of the regulating cylinder 19 moves further. The result is that the hydraulic undercarriage pump 12 has less pressure available and the hydraulic undercarriage pump 13 has more pressure available, and consequently the right-hand chain 4 of the vehicle 1 is moved more slowly and the left-hand chain 4 of the vehicle 1 is moved more quickly. The decrease in speed of the right-hand chain is here equal to the increase in speed of the left-hand chain. This ensures uniform cornering, and it is felt to be particularly beneficial that the center of the vehicle does not change its speed in relation to driving in a straight line.

The reversing of the tracked vehicle 1 is now described with reference to FIG. 5, and here again this steering movement will be to the right.

Figure 5:
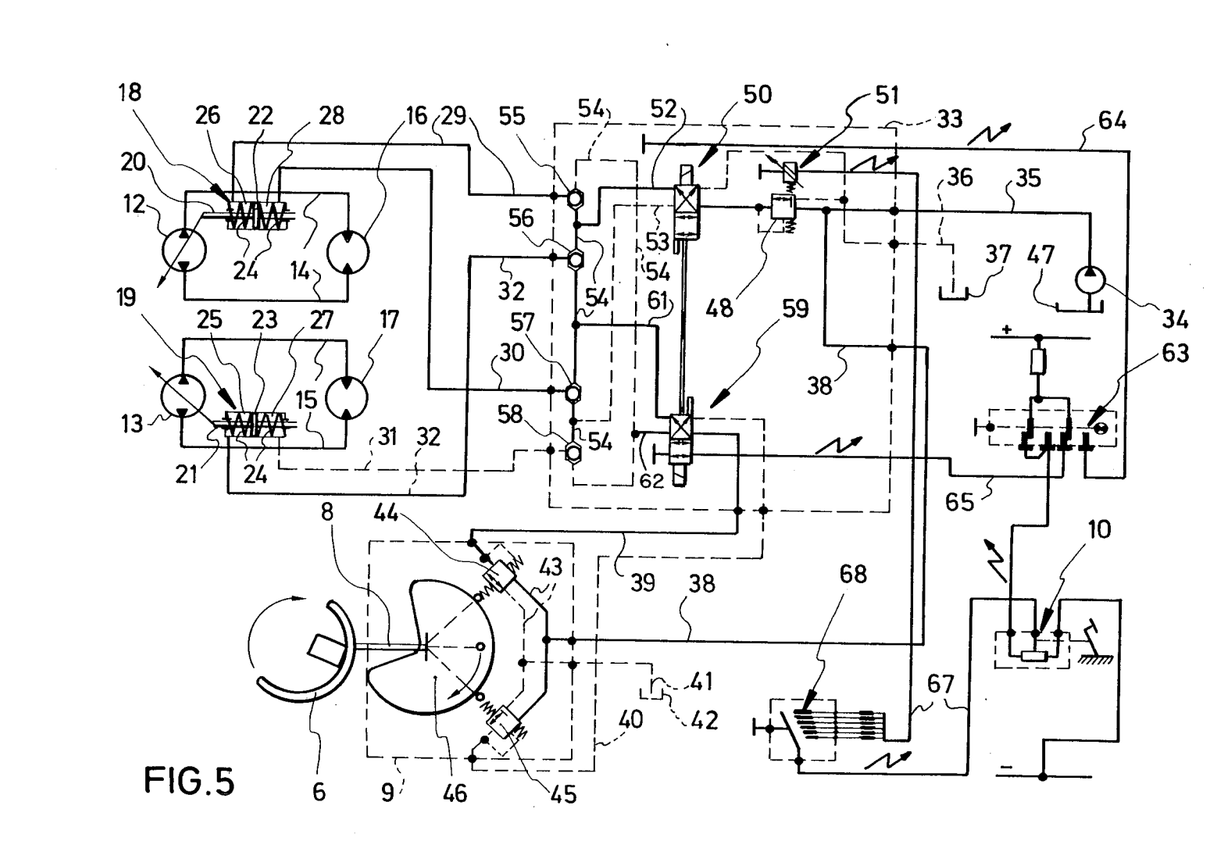
FIG. 5 shows a circuit of FIG. 3 when the tracked vehicle turns to the right in the reverse driving direction.

The direction-reversing switch 63 is now moved to the left, as can be seen in FIG. 5, with the result that a voltage is applied to the electrical line 65 and the 4/2-way valves 50 and 59 are moved into the switching position II, in which their outlets are interchanged. As already described, a specific driving stage is preselected by means of the maximum-voltage limiter 68 and the accelerator pedal 7 is then actuated. After the minimum pressure has been overcome, the first proportional valve 48 is actuated, with the result that the control fluid passes through the control line 49 and 4/2-way valve 50 via the control line 52 into the ring conduit 54 between the two change-over valves 55 and 56. As a result of the increasing pressure in the ring conduit 54 between the two change-over valves 55 and 56, the latter free their inlets, so that the control fluid passes via the control lines 29 and 32 to the rear regulating-cylinder chambers 26 and 25 of the regulating cylinders 18 and 19. The pressure building up in these regulating-cylinder chambers now ensures that the piston rods 20 and 21 are moved in the opposite direction to forward driving, so that the pump pivoting angle of the two undercarriage pumps 12 and 13 increases, albeit again in the same direction but in the opposite direction to forward driving. The tracked vehicle 1 now moves straight backwards.

When the steering wheel 6 is turned to the right, the proportional valve 44 is now once again actuated via the cam disc 46, so that, via the control line 39, control fluid passes through the 4/2-way valve 59 via the control line 61 into the ring conduit 54 between the two changeover valves 56 and 57. When the pressure of the control fluid between the two change-over valves 56 and 57 exceeds the drive pressure of the control fluid from the first proportional valve 48, control fluid flows, on the one hand, through the change-over valve 56 via the control line 32 to the rear regulating-cylinder chamber 25 of the regulating cylinder 19 and, on the other hand, through the change-over valve 57 via the control line 30 to the front regulating-cylinder chamber 28 of the regulating cylinder 18. As in forward driving described above, this ensures that the piston rod 20 moves back, whilst the piston rod 21 is moved further. Because of the simultaneous change in the pump pivoting angle of the undercarriage pumps 12 and 13, the right-hand chain 44 of the tracked vehicle 1 is moved more slowly, whereas the left-hand chain 4 of the tracked vehicle 1 is moved more quickly. As a result of this, the tracked vehicle 1 turns right even when reversing.

When the maximum-voltage limiter 68 is in a position in which it limits the maximum voltage to 0 volts, the tracked vehicle 1 can be turned on the spot, since one chain moves forwards, whilst the other chain moves backwards. It is also possible, although not shown in FIGS. 3 to 5, that, at full steering lock, after a detent has been overcome an electrical switch is actuated and sets the maximum voltage to 0 volts, as a result of which it then becomes possible in the way described above for the tracked vehicle 1 to turn on the spot. Instead of providing only one cam disc 46 for the two proportional valves 44 and 45, it is also possible to use two cam discs which are arranged above one another on the control column 8. It is thus also possible subsequently to adjust the straight-on position of the steering. Only one proportional valve 44 or 45 still need be actuated for the cornering of the vehicle.

An appreciable advantage of the hydraulic control system described is that it is always guaranteed that the vehicle will be steerable even in the event of failure of the electrical power supply.

What is claimed is:

1. A hydraulic control system for changing the speed and direction of a hydraulically operated tracked vehicle (1), with a feed pump (34) for a control fluid and with hydraulic undercarriage pumps (12,13) having adjustable pump pivoting angles and regulating cylinders (18,19) subjected to said control fluid and operable to adjust said pump pivoting angles, the regulating cylinders (18,19) being equipped respectively with two regulating-cylinder chambers (26,28) and (25,27) separated from one another by a regulating piston (22,23), for effecting speed changes there is provided a proportional valve (48) connected to the regulating-cylinder chambers (25 to 28), and for effecting changes of direction there is provided a mechanically controlled pressure-regulating valve (44,45) connected to respective two oppositely acting regulating-cylinder chambers (26,27) and (28,25) wherein the regulating-cylinder chambers (25 to 28) are connected via change-over valves (55 to 58) respectively independently to the proportional valve (48) and to the mechanically controlled pressure-regulating valves (44,45), the pressure of the control fluid between the proportional valve (48) and the change-over valves (55-58) for effecting speed changes always being lower than the pressure of the control fluid between the mechanically controlled pressure-regulating valve (44,45) and the change-over valves (55-58) for effecting changes of direction.

2. A control system as claimed in claim 1, wherein there are two mechanically controlled pressure-regulating valves (44,45) of which one (44) operates to effect steering in one direction and the other (45) operates to effect steering in the opposite direction.

3. A control system as claimed in claim 2, wherein the two mechanically controlled pressure-regulating valves (44,45) are actuated by means of at least one cam disc (46) attached to the control column of a steering wheel (6).

4. A control system as claimed in at least one of claims 1 to 3, wherein the proportional valve (48) is controllable by means of electric proportional controller (51) actuated by an accelerator pedal (7) incorporating a potentiometer (10).

5. A control system as claimed in claim 4, wherein an actuable maximum-voltage limiter (68) for limiting the greatest possible deflection of the proportional valve (48) is arranged in series with the potentiometer (10).

6. A control system as claimed in claim 1, wherein a 4/2-way valve (50) is arranged between the proportional valve (48) and the change-over valves (55 to 58), in such a way that, to reverse the direction of the vehicle (1), the respective other co-acting regulating-cylinder chambers (26,25) of the regulating cylinders (18,19) are connected to the proportional valve (48).

7. A control system as claimed in claim 6, wherein the 4/2-way valve (50) is coupled to a further 4/2-way valve (59) arranged between the mechanically controlled pressure-regulating valves (44,45) and the change-over valves (55 to 58), the coupling between said 4/2-way valves (50,59) being such that when the direction of the vehicle (1) is reversed, the respective other oppositely acting regulating-cylinder chambers (28,25) or (26,27) of the regulating-cylinders (18,19) are connected to the mechanically controlled pressure-regulating valves (44,45).

8. A control system as claimed in claim 7, wherein there are two undercarriage pumps (12,13) with two regulating cylinders (18,19), of which the regulating-cylinder chambers (25 to 28) are connected via four change-over valves (55 to 58) and the 4/2-way valve (50) to the proportional valve (48) for effecting speed changes and via the four change-over valves (55-58) and the 4/2-way valve (59) to the proportional valves (44,45) for effecting directional changes.

9. A control system as claimed in claim 7, wherein the 4/2-way valves (50,59) coupled to one another are actuable electrically via a direction-reversing switch (63).

* * * * *